(12) United States Patent
Drozd

(10) Patent No.: US 11,940,003 B1
(45) Date of Patent: Mar. 26, 2024

(54) VERTICAL BLINDS SUPPORT DEVICE

(71) Applicant: Ronald Drozd, Fort Lauderdale, FL (US)

(72) Inventor: Ronald Drozd, Fort Lauderdale, FL (US)

( * ) Notice: Subject to any disclaimer, the term of this patent is extended or adjusted under 35 U.S.C. 154(b) by 362 days.

(21) Appl. No.: 17/353,710

(22) Filed: Jun. 21, 2021

Related U.S. Application Data

(60) Provisional application No. 63/041,965, filed on Jun. 21, 2020.

(51) Int. Cl.
*F16B 7/04* (2006.01)
*E06B 9/36* (2006.01)

(52) U.S. Cl.
CPC ............... *F16B 7/04* (2013.01); *E06B 9/36* (2013.01)

(58) Field of Classification Search
CPC .. F16B 7/04; Y10T 24/1402; Y10T 24/45246; Y10T 24/45225; Y10T 24/45241
See application file for complete search history.

(56) References Cited

U.S. PATENT DOCUMENTS

| | | | | |
|---|---|---|---|---|
| 2,399,857 A | * | 5/1946 | Connors | B30B 9/00 100/219 |
| 4,606,666 A | * | 8/1986 | Patton | B42F 13/14 402/62 |
| 6,736,563 B1 | * | 5/2004 | With | B42F 3/04 402/60 |

* cited by examiner

*Primary Examiner* — Robert Sandy
(74) *Attorney, Agent, or Firm* — David P. Lhota, Esq.; Lhota & Associates, P.A.

(57) ABSTRACT

A vertical blinds support device having a pair of opposing plates wherein a first plate has two extending posts spaced at a predetermined distance from each other, each post having opposite surfaces with rails projecting from the surfaces of the posts, and a second plate having two apertures corresponding to the two posts with each of the apertures having interior ridges extending inward for receiving the posts, respectively, such that the rails slidably engage and releasably interlock with the interior ridges of corresponding apertures to join the two plates thereby sandwiching a plurality of vertical blinds therebetween. The distance between the plates may be adjusted by pushing or pulling the posts further into or out of the apertures. The vertical blind support device may be raised and lowered on the blinds to a desired position for separating the upper ends of the blinds to create a fanned appearance. The plates may be transparent or translucent to show the blinds being secured or have an opaque color to accent the color of the blinds.

17 Claims, 8 Drawing Sheets

US 11,940,003 B1

VERTICAL BLINDS SUPPORT DEVICE

CROSS-REFERENCE TO RELATED APPLICATION

This application claims the benefit of provisional application Ser. No. 63/041,965 filed Jun. 21, 2020.

STATEMENT REGARDING FEDERALLY SPONSORED RESEARCH OR DEVELOPMENT

N/A

FIELD OF THE INVENTION

The present invention relates to a vertical blinds accessory for windows, and in particular, to a window vertical blinds accessory for supporting, restraining, lifting and, or fanning including a pair of restraining plates for sandwiching a plurality of vertical blinds wherein each plate has a flange on opposite ends and corresponding notches for receiving an elastic band of predetermined elasticity in each flange for holding the plates together against the vertical blinds in a first position and for releasing or allowing the plates to be separated for placing the plates over the vertical blinds or adjusting the plates upward and downward along the vertical blinds.

BACKGROUND OF THE INVENTION

Vertical blinds are well known as window dressings in the art. Vertical blinds, however, are limited in their applications wherein they are either opened, closed, or partially opened. They also bang against each other from wind when the underlying window is opened creating an annoying noise and potentially damaging the blinds or breaking items in striking distance of the blinds. Accordingly, vertical blinds are typically left fully opened when the windows are open so as to not create the annoying sound or left closed to avoid the noise. Vertical blinds can also provide an obstacle to opening windows, vacuuming, or cleaning the floor and baseboards in homes and offices. If there existed a device that allowed vertical blinds to supported in fanned position, closed position for cleaning or partially opened position it would be well received. However, there are no devices known that adequately and effectively address these issues with vertical blinds.

It is therefore desirable to have a device that could conveniently, reliably, quickly, and efficiently support, restrain, or allow vertical blinds to be fanned. If there existed a device that addressed these shortcomings in the background art, it would be well received. As there are no known devices that satisfy or meet these objectives, there exists a need for such a device. It is, therefore, to the effective resolution of the aforementioned problems and shortcomings of the prior art that the present invention is directed. The instant invention addresses this unfulfilled need in the prior art by providing a vertical blinds accessory for supporting, restraining, lifting and, or fanning vertical blinds as contemplated by the instant invention disclosed herein.

SUMMARY OF THE INVENTION

In accordance with one aspect, the present invention provides a vertical blinds support device having a pair of opposing plates wherein a first plate has two extending posts spaced at a predetermined distance from each other and having at least one rail projecting from a surface of each of the posts and a second plate having two apertures with interior edges for receiving the posts, respectively, such that the rails slidably engage and releasably interlock with interior edges of corresponding apertures to join the two plates thereby sandwiching a plurality of vertical blinds therebetween.

In another aspect, the present invention provides a vertical blinds support device having a pair of opposing plates wherein a first plate has two extending posts spaced at a predetermined distance from each other, each post having opposite surfaces with rails projecting from the surfaces of the posts, and a second plate having two apertures corresponding to the two posts with each of the apertures having interior ridges extending inward for receiving the posts, respectively, such that the rails slidably engage and releasably interlock with the interior ridges of corresponding apertures to join the two plates thereby sandwiching a plurality of vertical blinds therebetween. The distance between the plates may be adjusted by pushing or pulling the posts further into or out of the apertures. The vertical blind support device may be raised and lowered on the blinds to a desired position for separating the upper ends of the blinds to create a fanned appearance. The plates may be transparent or translucent to show the blinds being secured or have an opaque color to accent the color of the blinds.

In an additional aspect, the present invention provides a vertical blinds support device having a pair of opposing plates wherein a first plate has a first post extending from a first surface of the plate proximal a first edge and a second post extending from the first surface proximal a second edge, each of the first and second posts having first and second surfaces on opposite sides of the posts with a plurality of rails projecting from the surfaces of the posts, and a second plate having first aperture corresponding to the first post and a second aperture corresponding to the second post for slidably receiving and adjusting the posts, respectively, a first insert securely inserted in the first aperture and a second insert securely inserted in the second aperture, wherein the first insert has first interior ridges extending inward into the first aperture for slidably receiving and interlocking with the rails on the first post and the second insert has second interior ridges extending inward into the second aperture for slidably receiving and interlocking with the rails on the second posts so as to join the two plates to securely sandwich and support a plurality of vertical blinds therebetween. The plates may be positioned to hold the vertical blinds together or to allow the upper part of the blinds to be separated to create a fanned-out appearance wherein the plates may be moved up or down the blinds to alter the fanned appearance. The distance between the plates may be adjusted by pushing or pulling the posts further into or out of the apertures. The plates may be transparent or translucent to show the blinds being secured or have an opaque color to accent the color of the blinds.

In accordance with these and other objects, which will become apparent hereinafter, the instant invention will now be described with particular reference to the accompanying drawings.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
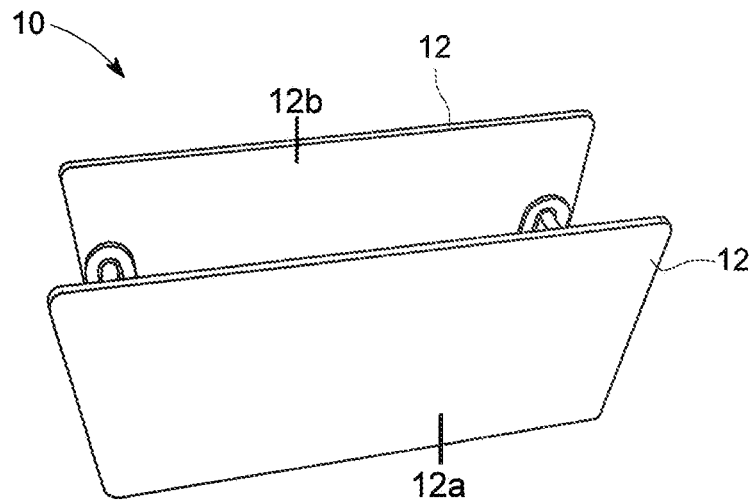
FIG. 1 is front perspective view of the vertical blinds support device in accordance with the principles of a preferred embodiment of the present invention.
Figure 2:
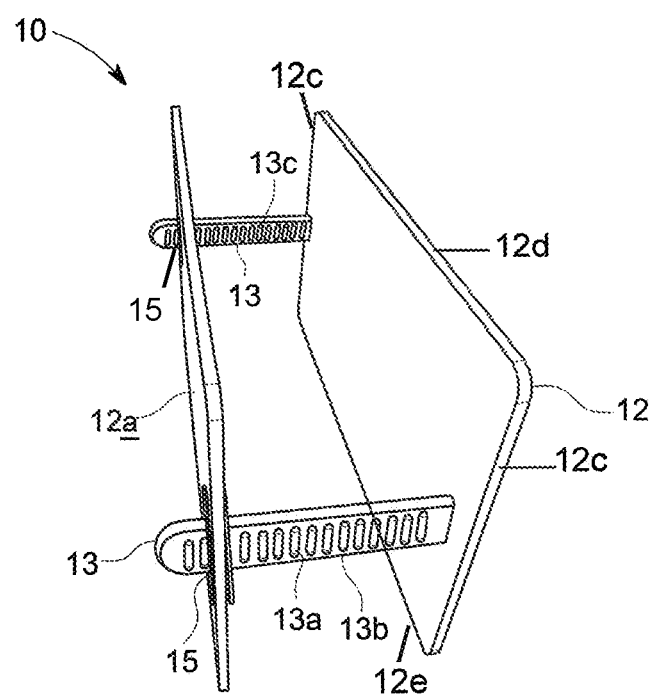
FIG. 2 is a side perspective view of the vertical blinds support device shown in FIG. 1 in accordance with the principles of the preferred embodiment of the present invention.
Figure 3:
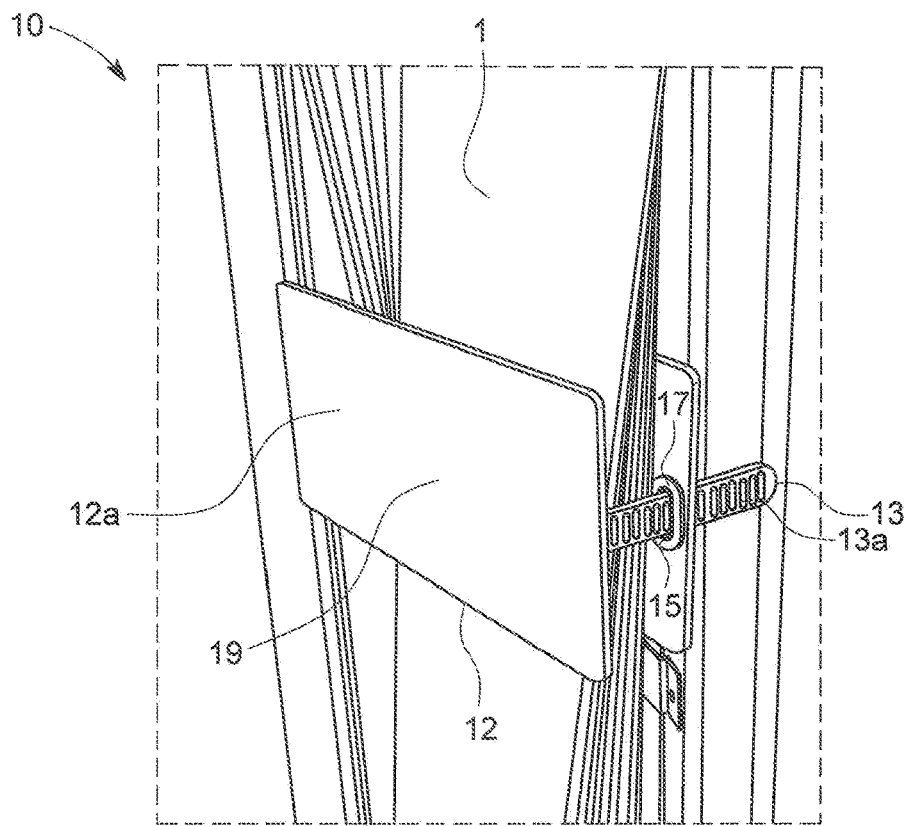
FIG. 3 is a perspective view of the vertical blinds support device of FIG. 1 holding vertical blinds in a closed secured position in accordance with the principles of the preferred embodiment of the present invention.
Figure 4:
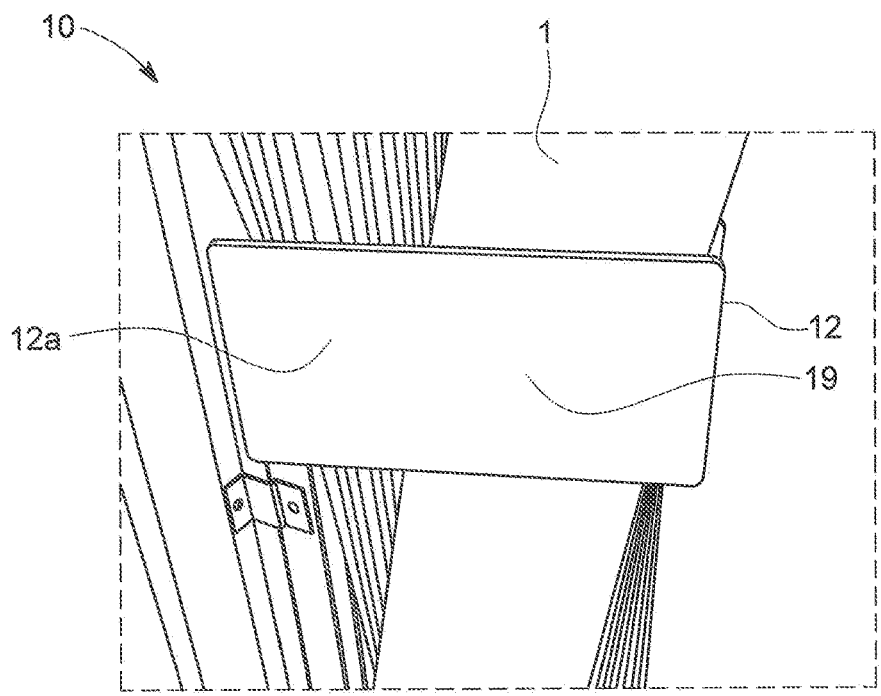
FIG. 4 is an elevational view of the vertical blinds support device of FIG. 1 holding vertical blinds in a closed secured position in accordance with the principles of the preferred embodiment of the present invention.
Figure 5:
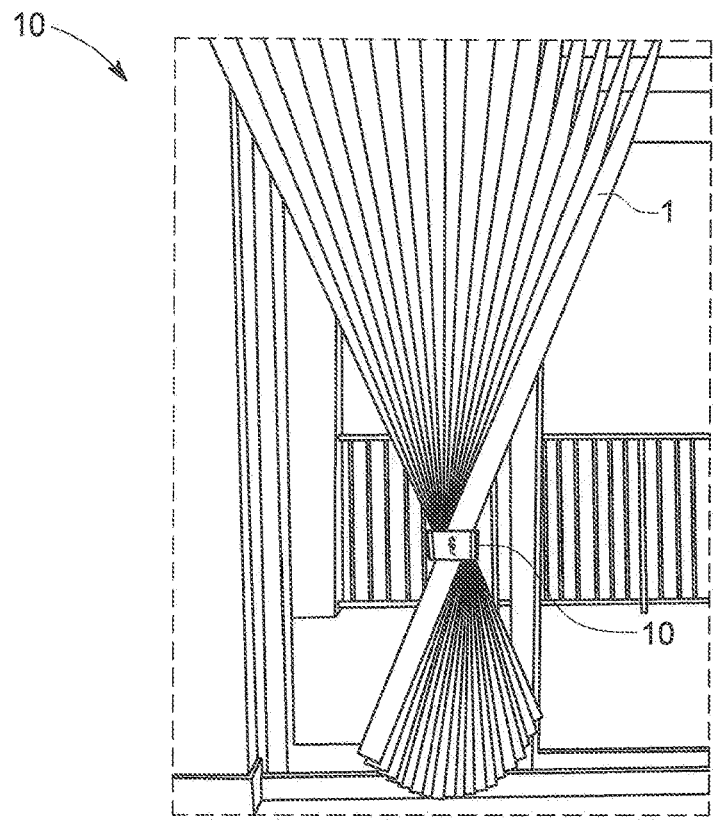
FIG. 5 is a perspective view of the vertical blinds support device of FIG. 1 showing the vertical blinds in a fanned position in accordance with the principles of the preferred embodiment of the present invention.
Figure 11:
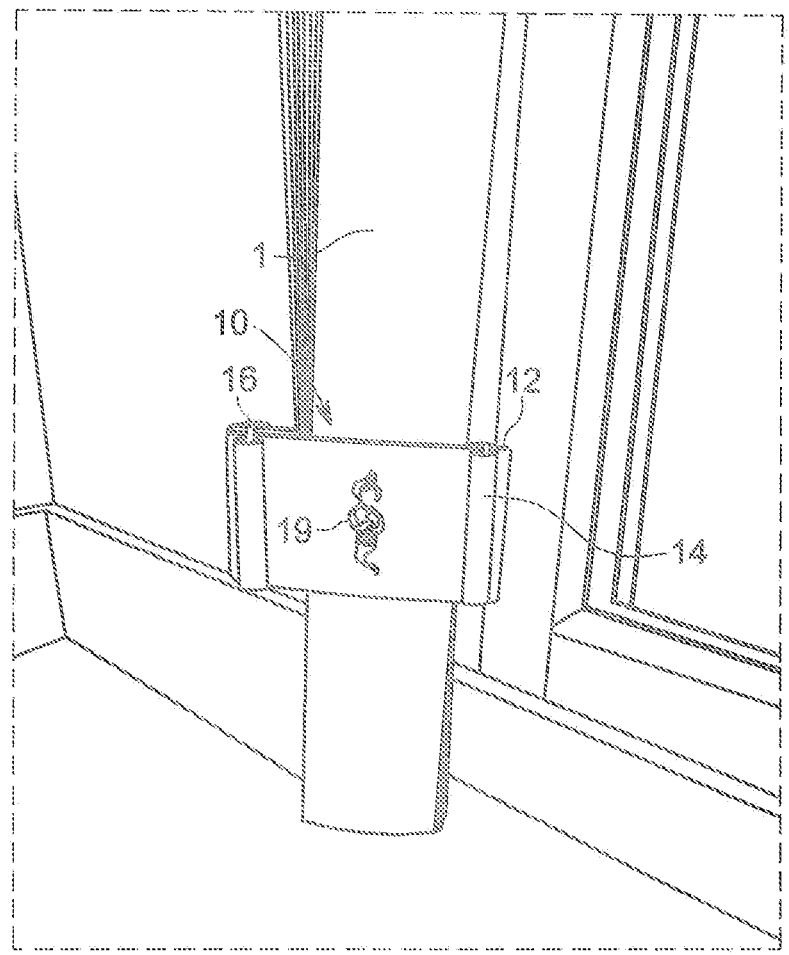
FIG. 11 is a perspective view of the vertical blinds support device of FIG. 9 showing vertical blinds in a closed secured position in accordance with the principles of the alternative embodiment of the present invention.
Figure 12:
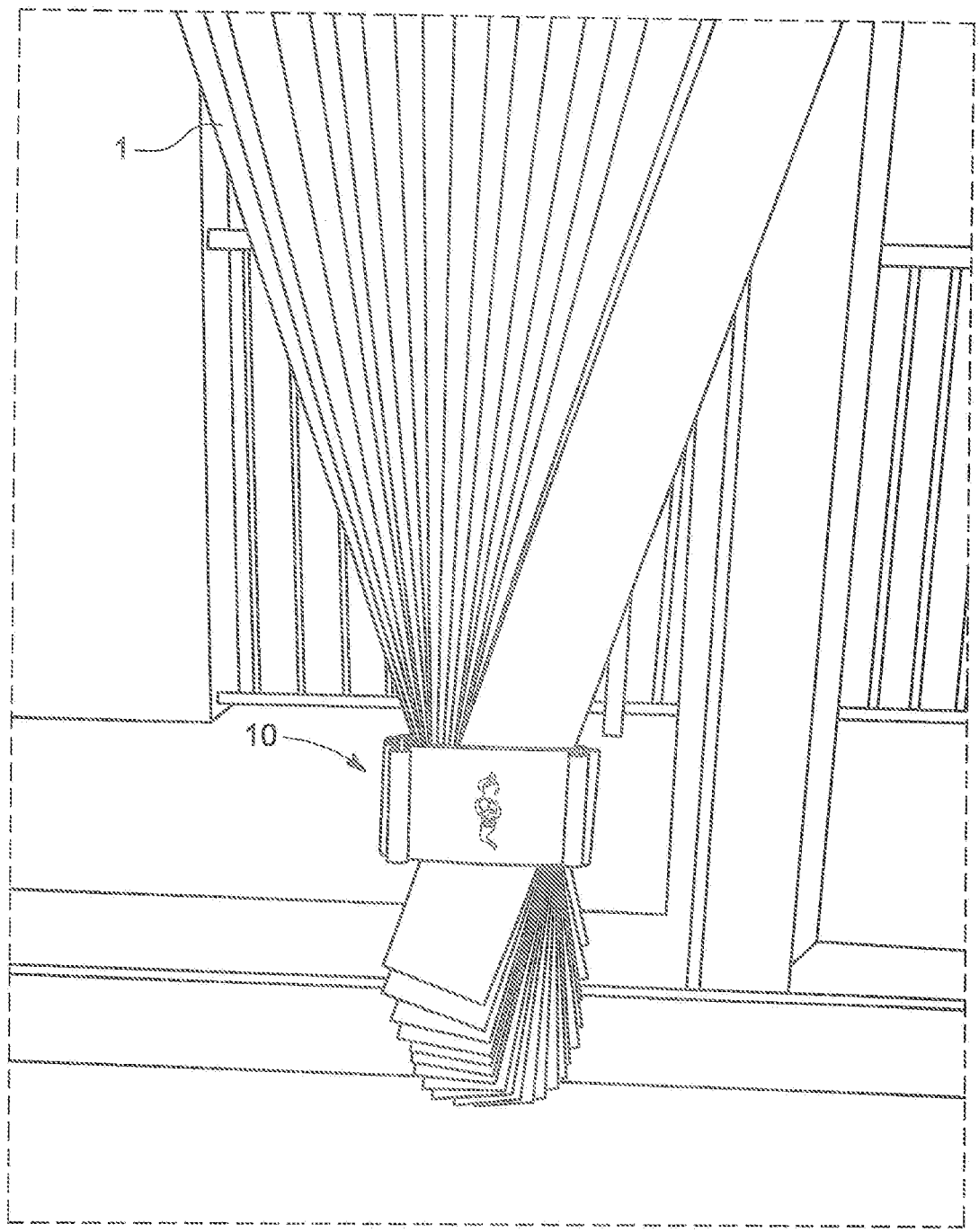
FIG. 12 is a perspective view of the vertical blinds support device of FIG. 9 showing the vertical blinds in a fanned position in accordance with the principles of the alternative embodiment of the present invention.

With reference to the drawings in which like reference designators refer to like elements, FIGS. 1 to 12 depict the preferred and alternative embodiments of the instant invention which is generally referenced as a vertical blinds support device, support device and, or by numeric character 10. There is shown in FIGS. 1-12 a vertical blinds support device 10 for supporting, holding, or fanning vertical blinds 1 in front of a window for aesthetics or above a floor or away from a wall to facilitate convenient cleaning, painting or maintenance of the floor or baseboard. The vertical blinds support device 10 may be used to hold all the blinds 1 together at one end of a window for cleaning or maintenance purposes as shown in FIG. 11. The support device 10 may also be positioned and secured at a point along the length of the blinds 1 that allow the upper ends of the blinds to be separated to create a fanned look, appearance or aesthetic as shown in FIGS. 5 and 12.

With reference to FIGS. 1-8, the preferred embodiment of the vertical blinds support device 10 includes a pair of plates 12, a pair of posts 13 projecting from one or the first plate 12, a pair of apertures 15 defined in the second plate 12, an outside surface 13a and inside surface 13b defined by the posts 13, and a plurality of rails 13c extending from the surfaces 13a and 13b, respectively. The plates 12 having outside surfaces 12a and inside surfaces 12b on opposite sides and outer side 12c, top 12d and bottom edges 12e. The inside surfaces 12a are opposing surfaces that face each other and the outer edges align when the plates 12 are joined together. The posts 13 and apertures 15 are spaced from the side edges 12c and top edges 12d and bottom edges 12e so that they align and mate when the plates are joined in a manner that also aligns the side, top and bottom edges 12c-e for balanced and increased support of the vertical blinds 1 as well as a clean finished appearance, as shown in FIGS. 1-6. One or both plate outside surfaces 12a may include an indicia 19 such as company or team logo or other indicia for conveying a message.

Figure 6:
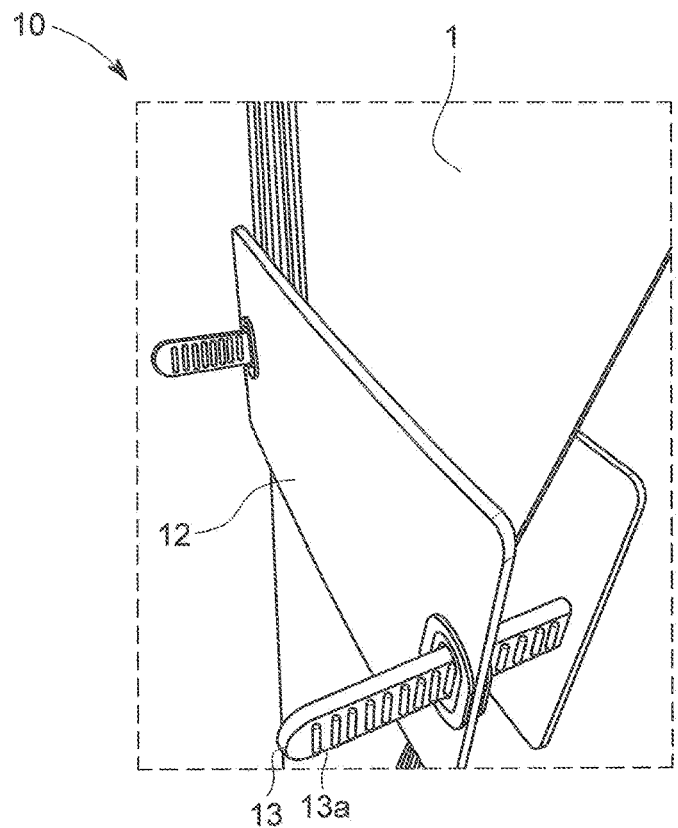
FIG. 6 is a side perspective view of the vertical blinds support device shown in FIG. 1 installed on vertical blinds in accordance with the principles of the preferred embodiment of the present invention.
Figure 6A:
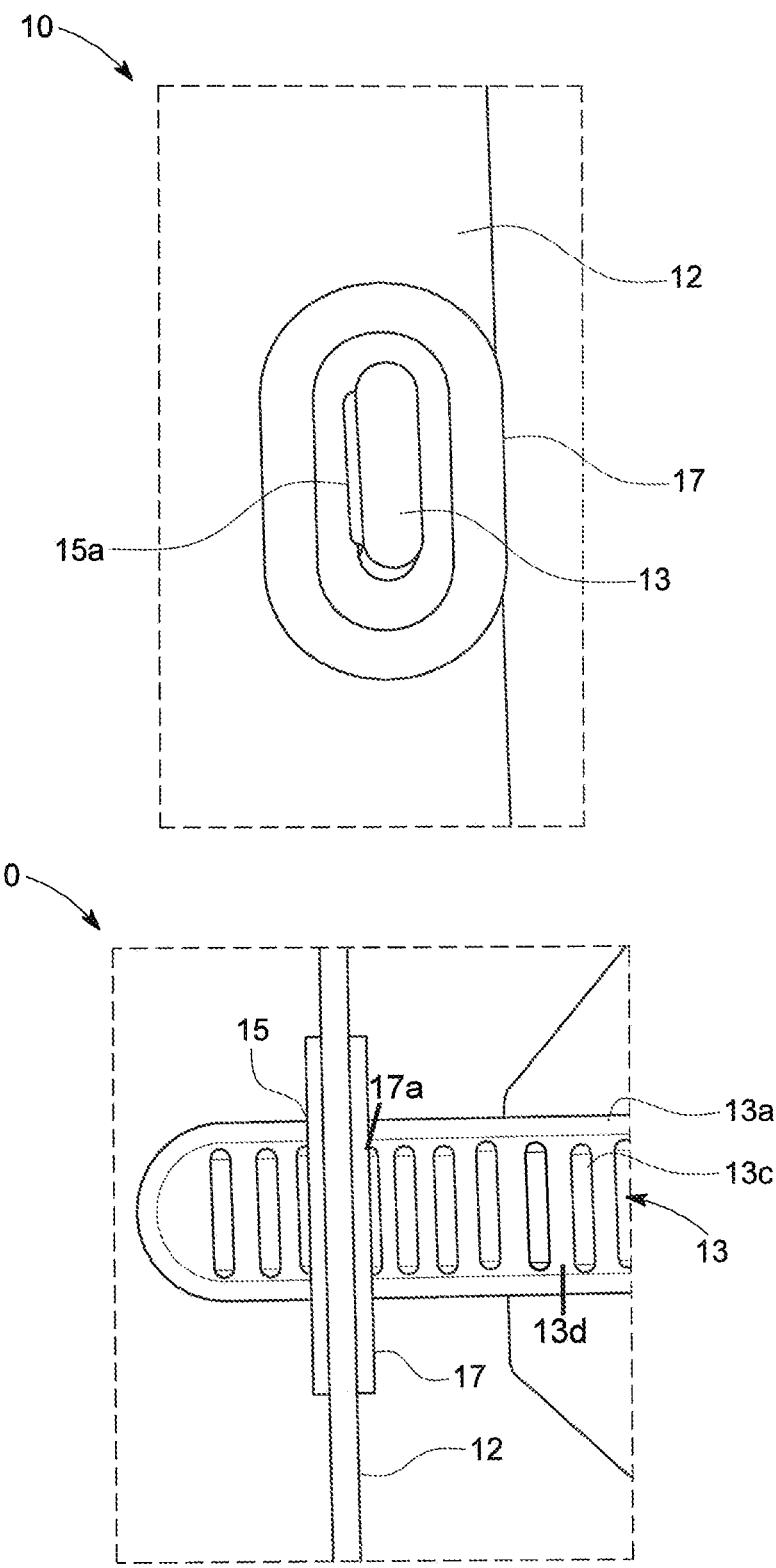
FIG. 6A are exploded views of the vertical blind support device of FIG. 1 illustrating the connection between a post and aperture in accordance with the principles of the preferred embodiment of the present invention.
Figure 7:
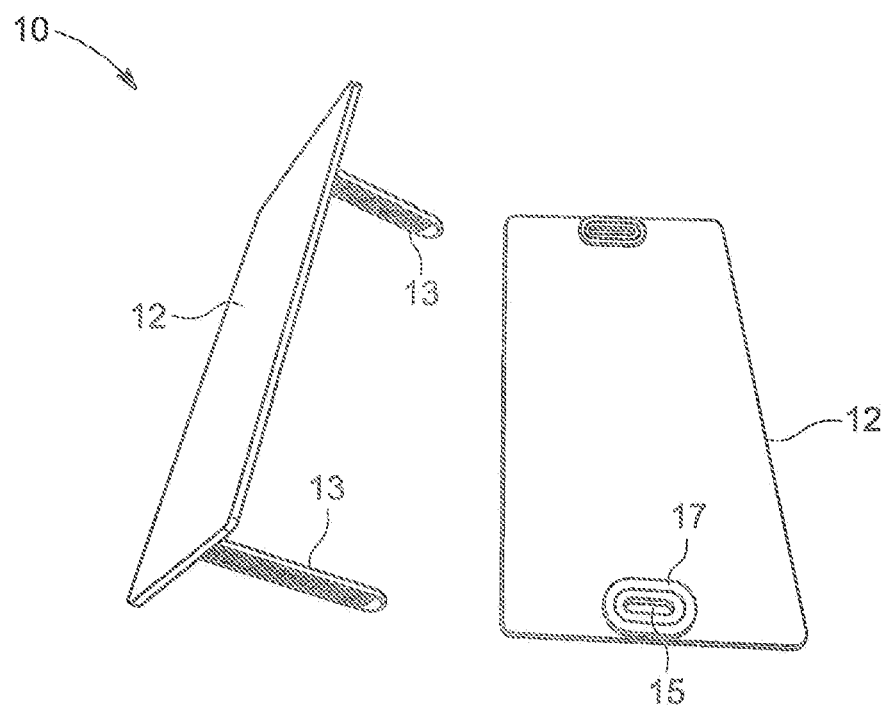
FIG. 7 is an exploded perspective view of the vertical blinds support device in accordance with the principles of the preferred embodiment of the present invention.
Figure 8:
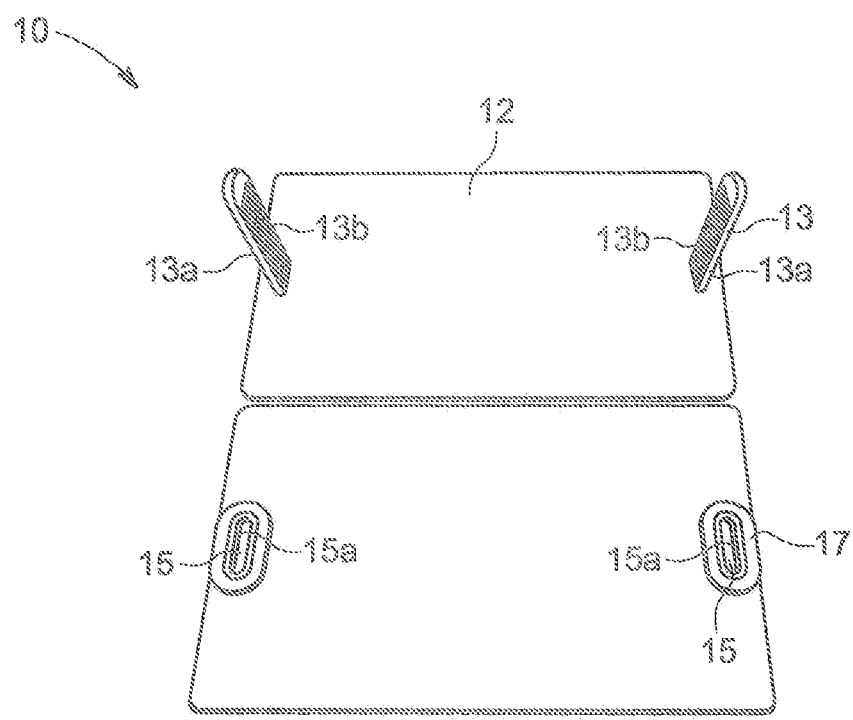
FIG. 8 is an exploded elevational diagram view of the vertical blinds support device shown in FIG. 1 in accordance with the principles of the preferred embodiment of the present invention.
Figure 9:
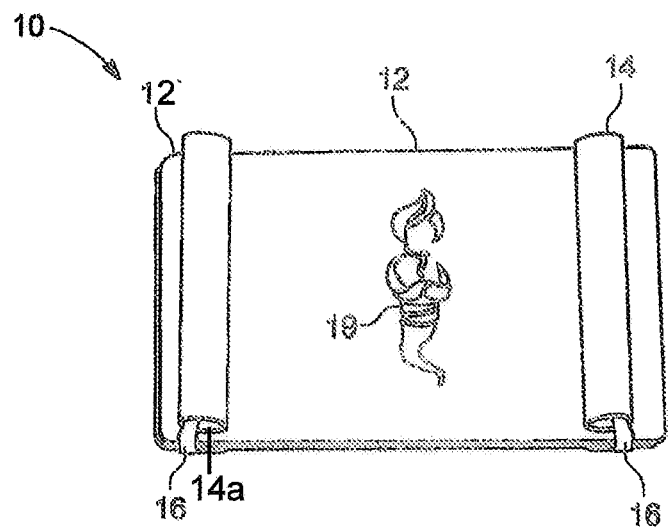
FIG. 9 is perspective view of the vertical blinds support device in accordance with the principles of an alternative embodiment of the present invention.
Figure 10:
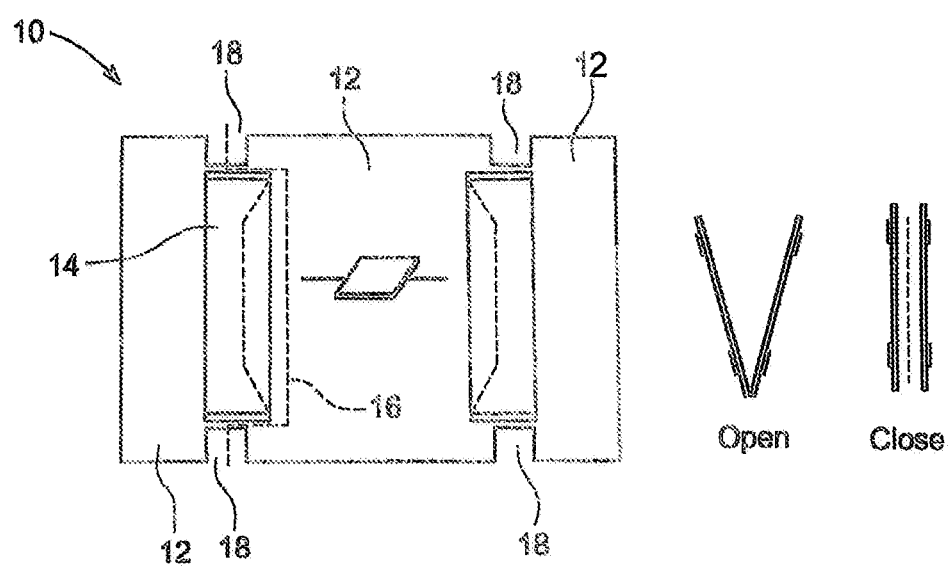
FIG. 10 is an elevational diagram view of the vertical blinds support device shown in FIG. 9 in accordance with the principles of the alternative embodiment of the present invention.

Referring to FIGS. 2 and 6-8, the rails 13c preferably project from the posts outside surfaces 13a and inside surfaces 13b and ride along an interior aperture edge 15a when the posts 13 are inserted into the apertures 15. The rails 13c have a fixed end against the posts 13 and a free end away from the posts 13. The free end of the rails 13c are preferably arcuate but may be triangular or have at least one straight edge. A space 13d is defined between each of the rails 13c wherein the apertures' edge (or edges) 15a rests, as shown in FIG. 6A, when the plates 12, posts 13 and apertures 15 are positioned relative to each other in the desired position for supporting and securing the blinds 1. The edge 15a of the apertures 15 may define a protruding ridge 15a that rides and rests between the rails 13c. The support device 10 may include an aperture insert 17 that snaps into the aperture 15. The insert 17 may include a ridge 17a that rides and rests between the rails 13c when the posts 13 are inserted into the apertures 15. The rails 13e may only project from one of the surfaces 13a or 13b of the posts 13 in an alternative embodiment but preferably project from both surfaces 13a and 13b for enhanced stability.

Still referring to FIGS. 1-8, to use the vertical blind support device 10 in accordance with the preferred embodiment, the plates 12 are generally oriented on opposite sides of the vertical blinds 1 as shown in FIGS. 3-6. In particular, either the first or second plate 12 is placed against one side of the blinds 1 and the other plate placed on the opposite side of the blinds 1. The posts 13 from the first plate 12 are aligned with the apertures 15 of the second plate 12. The plates 12 are then pushed together causing the rails 13c of the posts 13 to ratchet over the aperture edge or ridge 15a of the second plate 12. The plates 12 are pushed together until snugly and securely supported around the blinds 1. The blinds 1 are then secured and supported together for cleaning. To fan the blinds 1, the portion above the support device 10 are separated until the desired affect is achieved as shown in FIGS. 5 and 12. For further spreading, the support device 10 is lowered by pushing the device 10 downward. Likewise, the device 10 may be urged upward for a desired fan look. The plates 12 may not necessarily have to be loosened to slide the device up and down the blinds 1 but may be for easier movement by pulling the plates 12 apart slightly. Once the support device 10 is in the desired position the plates 12 are pushed back together until snugly supporting the blinds 1. To remove the device 10, the plates 12 are simply pulled apart. The posts 13 and plates 12 may need to be urged with a little force to overcome the pressure of the rails 13c.

With reference to FIGS. 9-12, the alternative embodiment of the vertical blinds support accessory includes a pair of plates 12 wherein each plate 12 has a flange 14 along opposite edges, a removable elastic band 16 for wrapping around the plates 12 in flange passage ways 14a defined by the flanges 14 and notches 18 defined in the plates below and above the flanges 14. Each plate 12 has or defines a flange 14 that may resemble a C shaped clip or hook. Each plate 12 has opposing interior surfaces that face each other when vertical blinds are being sandwiched and secured. The elastic band 16 fits in each flange passage way 14a and notch 18 to hold the plates 12 together against the vertical blinds with enough force to keep the blinds stable without unintentionally sliding up or down the vertical blinds unless urged under pressure by an individual. The notches 18 keep the bands 16 from sliding along the edge of the plates 12. The plates 12 are preferably approximately 4 inches in height by 8 inches in width and six inches between the flanges 14. The exterior surfaces of the plates 12 may include a logo.

Referring to FIGS. 11-12, the vertical blinds support device 10 is mounted over a plurality of vertical blinds by leaving one elastic band 16 in position on end of the pair of plates 12 and spreading the opposite ends of plates 12 without an elastic band apart into a V-shape, as shown in FIG. 12, and placing the open end over the vertical blinds 12. Once the plates 12 are place over the vertical blinds 1 in the desired position, the second elastic band 16 is placed over the free ends of the plates 12 and into the flange 14 and corresponding notches 18. The support device 10 is securely fixed in place once the second band is released unless intentionally urged upward or downward by human force. The vertical blinds 1 may be spread apart above the support device 10 for a fanned appearance as shown in FIGS. 5 and 12.

With reference to FIGS. 1-12, the embodiments of the vertical blinds support device 10 preferably includes plates 12 that are approximately 4 inches in height by 8 inches in width and six inches between the flanges 14. The plates 12 are preferably made from an injection molded plastic, wood, wood-like material plastic-like material, fiberglass, or comparable substitute. The exterior surfaces of the plates 12 may include a logo 19. The plates 12 may be transparent or translucent to show the blinds and hence the color of the blinds thereby producing and effecting a uniform appearance without the plates being conspicuous. Conversely, the plates 12 may have a variety of different colors that may be used to mix and match with the color of the blinds to accent or compliment the aesthetics of the blinds.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A vertical blinds support device for supporting, securing, and arranging vertical blinds, said vertical blinds support device comprising:
    a pair of opposing plates including a first plate having a first outer surface and a first inner surface and a second plate having a second outer surface and a second inner surface;
    a pair of posts including a first post and a second post extending outward from said first inner surface of said first plate inner spaced at a predetermined distance from each other;
    a first flat surface defined by said first post, at least one first rail projecting from said first flat surface of said first post;
    at least one second rail projecting from a surface of said second post; and
    a first aperture and a second aperture defined by said second plate, said first aperture defining a first interior edge, said second aperture defining a second interior edge, said first aperture being oriented so as to be in alignment with said first post and said second aperture being oriented to be in alignment with said second post when said first plate inner surface is aligned with said first plate inner surface or outer surface, and
    said first rail riding over said first interior edge and said second rail riding over said second interior edge when said first and second posts are aligned with and inserted into said first and second apertures, respectively, for sandwiching the vertical blinds between the first and second plates, said first and second plates being held together by joining and maintaining joinder of said first and second posts, said posts being removable from said apertures by pulling said first and second plates apart with enough force to urge the first and second rails over the first and second edges, respectively.

2. A vertical blinds support device as recited in claim 1, wherein said first post further comprises:
    a plurality of first rails projecting from a surface of said first post.

3. A vertical blinds support device as recited in claim 2, wherein said second post further comprises:
    a plurality of second rails projecting from a surface of said second post.

4. A vertical blinds support device as recited in claim 1, wherein said second post further comprises:
    a second post flat surface, said second rail projecting from said second post flat surface.

5. A vertical blinds support device as recited in claim 1, further comprising:
    a first post first flat surface defined by said first post, said first rail projecting from said first post first flat surface;
    a first post second flat surface defined by said first post, a second first rail projecting from said first post second flat surface;
    a second post first flat surface defined by said second post, said second rail projecting from said second post first flat surface; and
    a second post second flat surface defined by said second post, a second second rail projecting from said second post second flat surface.

6. A vertical blinds support device as recited in claim 5, further comprising:
- a plurality of first rails projecting from said first post first flat surface;
- a plurality of first rails projecting from said first post second flat surface;
- a plurality of second rails projecting from said second post first flat surface; and
- a plurality of second rails projecting from said second post second flat surface.

7. A vertical blinds support device as recited in claim 1, further comprising:
- indicia displayed from said first plate outer surface.

8. A vertical blinds support device as recited in claim 1, further comprising:
- indicia displayed from said second plate outer surface.

9. A vertical blinds support device as recited in claim 1, wherein said first plate, and said second plate are translucent.

10. A vertical blinds support device for supporting, securing, and arranging vertical blinds, said vertical blinds support device comprising:
- a pair of opposing plates including a first plate having a first outer surface and a first inner surface and a second plate having a second outer surface and a second inner surface;
- a pair of flanges including a first flange and a second flange extending outward from said first plate inner spaced at a predetermined distance from each other;
- a pair of flange mating elements defined by said second plate;
- a joinder means for joining said pair of flanges with said pair of flange mating elements for coupling said first plate and second plate together around vertical blinds; and
- said flanges having a flange proximal each end of said first panel, each said flange defining a passage way.

11. A vertical blinds support device as recited in claim 10, wherein said pair of flange mating elements comprise:
- first aperture and a second aperture.

12. A vertical blinds support device as recited in claim 10, wherein said pair of flange mating elements comprise:
- a flange proximal each end of said second panel, each said flange defining a passage way.

13. A vertical blinds support device as recited in claim 12, wherein said joinder means for joining said pair of flanges comprise:
- elastic bands that wrap through said flange of said first panel and said second panel.

14. A vertical blinds support device as recited in claim 10, wherein said joinder means for joining said pair of flanges comprise:
- elastic bands that wrap through said flange and said flange mating elements.

15. A vertical blinds support device as recited in claim 10, wherein:
- said flanges comprise a first post and second post projecting from said first panel; and
- said means for joining said pair of flanges comprises:
  - a plurality of first rails projecting from a surface of said first post;
  - a plurality of second rails projecting from a surface of said second post;
  - a first aperture and a second aperture defined by said second plate, said first aperture defining a first interior edge, said second aperture defining a second interior edge, said first aperture being oriented so as to be in alignment with said first post and said second aperture being oriented to be in alignment with said second post when said first plate inner surface is aligned with said first plate inner surface or outer surface, and
  - said first rail riding over said first interior edge and said second rail riding over said second interior edge when said first and second posts are aligned with and inserted into said first and second apertures, respectively, for sandwiching the vertical blinds between the first and second plates, said first and second plates being held together by joining and maintaining joinder of said first and second posts, said posts being removable from said apertures by pulling said first and second plates apart with enough force to urge the first and second rails over the first and second edges, respectively.

16. A vertical blinds support device as recited in claim 15, wherein:
- said first post has a first flat surface and said first rails projecting from said first post first flat surface;
- said first post has a second flat surface and said first rails projecting from said first post second flat surface;
- said second post has a first flat surface and said second rails projecting from said second post first flat surface; and
- said second post has a second flat surface and said second rails projecting from said second post second flat surface.

17. A vertical blinds support device as recited in claim 10, wherein said first plate, and said second plate are translucent.

* * * * *